United States Patent [19]

Cole

[11] 4,436,425
[45] Mar. 13, 1984

[54] SIGNAL WAVEFORM DETECTOR USING SYNTHETIC FM DEMODULATION

[75] Inventor: James H. Cole, Great Falls, Va.

[73] Assignee: The United States of America as represented by the Secretary of the Navy, Washington, D.C.

[21] Appl. No.: 362,813

[22] Filed: Mar. 29, 1982

[51] Int. Cl.³ .............................................. G01B 9/02
[52] U.S. Cl. ..................................... 356/361; 367/149
[58] Field of Search ................. 356/349, 361; 73/655, 73/657; 367/149; 250/227, 231 R

[56] References Cited

U.S. PATENT DOCUMENTS

| | | | |
|---|---|---|---|
| 3,670,098 | 6/1972 | Korpel | 356/349 X |
| 4,162,397 | 7/1979 | Bucaro et al. | 367/149 X |
| 4,313,185 | 1/1982 | Chovan | 356/349 X |
| 4,320,475 | 3/1982 | Leclerc et al. | 367/149 |
| 4,363,114 | 12/1982 | Bucaro et al. | 73/655 X |

OTHER PUBLICATIONS

Koo et al., "Frequency Mixing in Fibre-Optic Interferometer Systems", *Electronics Letters*, vol. 17, No. 11, pp. 380–382, 5/81.

*Primary Examiner*—William L. Sikes
*Assistant Examiner*—Matthew W. Koren
*Attorney, Agent, or Firm*—Robert F. Beers; William T. Ellis; Alan P. Klein

[57] ABSTRACT

A test signal waveform detector that includes a fiber optic interferometer wherein the phase difference of the two parts of a split laser beam is modulated by the waveform of a sinusoidal test signal which is to be detected and by the waveform of a sinusoidal reference signal, and the two parts of the split beam are recombined and mixed on the face of a photodetector. A signal conversion circuit converts the ac signal produced by the photodetector to another ac signal that carries the test signal information as an equivalent frequency modulation, and a demodulator extracts the test signal information from the latter ac signal.

7 Claims, 2 Drawing Figures

SIGNAL WAVEFORM DETECTOR USING SYNTHETIC FM DEMODULATION

BACKGROUND OF THE INVENTION

This invention relates generally to signal waveform detectors, and more particularly to optical systems which detect signal waveforms.

In fiber optic interferometric sensing systems, phase noise produced by thermal fluctuations or mechanical vibrations is so large that the output is driven non-linear. This non-linearity causes the desired signal to fade in and out. It is known to optimize the signal output by employing a demodulation technique. Prior art demodulation techniques include heterodyne-FM, homodyne phase-lock, phase modulation, phase-swept phase-locked-loop and frequency stabilization. All of these techniques suffer from disadvantages.

A device of the heterodyne demodulation type has been described in the paper "Optical Hydrophone for Sonar", J. A. Bucaro, *EASCON 78 Record*, IEEE Publications 78 CH 1354-4 AES, p. 298.

In a heterodyne system the light frequency of one beam of the interferometer is shifted in frequency by an amount equal to the frequency used to drive a Bragg modulator. The output of the interferometer detected by a photodetector has a carrier signal at the frequency used to drive the Bragg modulator. If FM discrimination is utilized to obtain the sensor output of interest, heterodyne demodulation is relatively insensitive to intensity and polarization fluctuations. In systems applications heterodyning demodulation can employ one modulator to provide the optical source for several sensors. However, heterodyning-demodulation has significant disadvantages. Integrated optic Bragg modulators restrict the optical power. Either or both optical and electrical power requirements for heterodyne systems are worse than for other detection techniques; minimum detectable phase shifts currently demonstrated with heterodyne demodulation techniques which employ reasonable package sizes are approximately two orders of magnitude greater than other techniques. Heterodyne detection does not appear competitive with alternate demodulation techniques.

A device of the homodyne phase-lock type has been described in the paper "Measurements of Small Phase Shifts Using a Single Mode Optical-Fiber Interferometer", P. A. Jackson et al., *Optics Letters*, pp. 139–141, April 1980.

In homodyne phase-lock demodulation, the dc output of the detector is utilized as a signal proportional to the instantaneous phase of the interferometer. The output of the detector is amplified, low pass filtered and then sent to a device which induces a phase shift in the interferometer proportional to the applied voltage. In a system where multisensor operation is required, this demodulation technique has the disadvantage that a modulator is required for each sensor.

A device of the phase modulation type has been described in the paper "Fiber Interferometer Demodulation and Noise", J. H. Cole et al., *FOC 81 EAST Fiber Optics and Communications Proceedings*, published by Information Gatekeepers Inc.

The phase modulation technique eliminates the requirement for a modulator associated with each sensor, but as an amplitude demodulation technique suffers sensitivity to amplitude fluctuations.

A device of the phase-swept phase-locked-loop type has been described in the paper "Accurate Phase Measurement System for a Fiber Optic Interferometer", I. J. Bush, *Digest of Technical Papers, Conference on Lasers and Electrooptics*, 10–12 June 1981, IEEE/OSA Washington, D.C.

The phase-swept phase-locked-loop as an embodiment of the homodyne detection system also requires a modulator per sensor. This technique, along with the homodyne demodulation scheme, requires modulators with large dynamic ranges.

SUMMARY OF THE INVENTION

It is therefore an object of this invention to employ a new modulation technique for optimizing the signal output of an optical interferometric sensing system.

Another object is employ a technique that has all of the advantages of heterodyne-FM discrimination but does not require the power consumption of the heterodyne modulator.

A further object is to employ a modulator as the optical source for several sensors in an optical interferometric sensing system.

These and other objects of the present invention are achieved by a detector for detecting the waveform of a test signal. The test signal waveform detector includes an interferometer wherein the phase difference of the two parts of a split optical beam is modulated by the waveform of the sinusoidal test signal and by the waveform of a sinusoidal reference signal, and the two parts of the split beam are recombined and mixed on the face of a photodetector. A signal conversion means converts the ac signal produced by the photodetector to another ac signal that carries the test signal information as an equivalent frequency modulation, and the test signal information is extracted from the latter ac signal by a demodulator.

The utilization of a phase swept technique eliminates the requirement for a single modulator per sensor for multisensor systems. By synthesizing an FM signal, the system has all the advantages of heterodyne-FM discrimination; i.e., insensitivity to optical power (amplitude) fluctuations, polarization fluctuations, and reset problems associated with other detection techniques. The phase swept modulator does not require the power consumption of the heterodyne modulator.

Additional advantages and features will become apparent as the subject invention becomes better understood by reference to the following detailed description when considered in conjunction with the accompanying drawing wherein:

DESCRIPTION OF THE PREFERRED EMBODIMENTS

Figure 1:
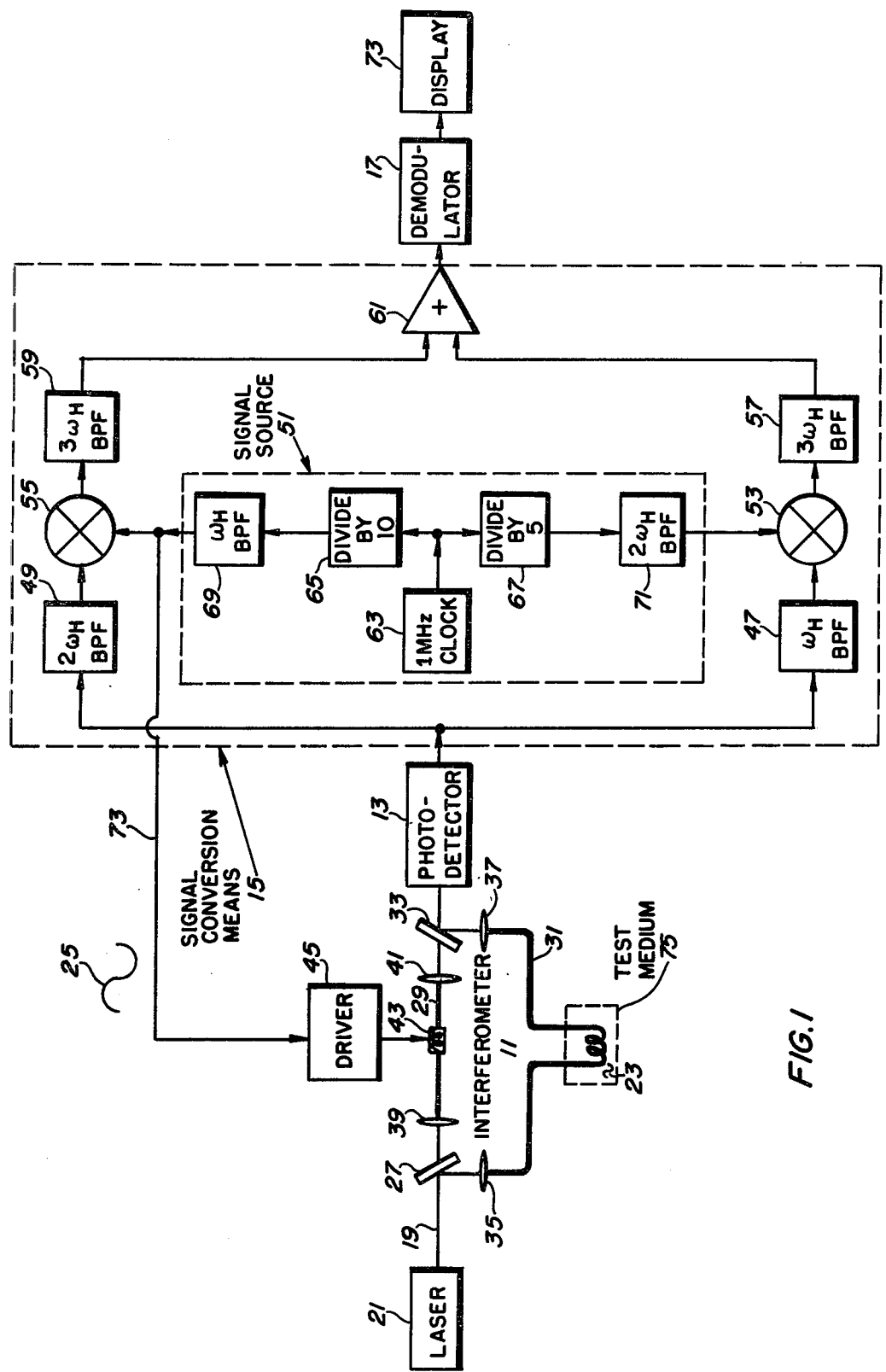
FIG. 1 is a block schematic diagram of a first embodiment of the test signal waveform detector according to the invention, wherein one test arm is provided.

Referring to FIG. 1, there is shown a detector for detecting the waveform of a test signal. The test signal waveform detector includes an interferometer 11; a photodetector 13 disposed at the output of the interferometer; a signal conversion means 15 connected to the photodetector; and a demodulator 17 connected to the signal conversion means.

The interferometer 11 is employed to split a light beam 19 from an external coherent light source, such as a laser 21, into two parts, to modulate the phase difference of the two parts by the waveform of a sinusoidal test signal 23 and the waveform of a sinusoidal reference signal 25 of frequency $\omega_H$ (the reference signal acts as a carrier to the test signal information), and recombine the two parts of the split beam to form an interference pattern on the face of the photodetector 13. While the interferometer 13 may take a variety of forms, conveniently it may take the form illustrated in FIG. 1 of a beamsplitter 27; a pair of single mode coiled optical fibers 29 and 31 respectively forming the test and reference arms of the interferometer; another beamsplitter 33, one pair of lenses 35 and 37 disposed between the beamsplitters and the test arm fiber; another pair of lenses 39 and 41 disposed between the beamsplitters and the reference arm fiber; a thin-walled piezoelectric cylinder 43 inserted inside the tightly-wrapped coil of the reference arm fiber; and a driver 45 connected to the cylinder 43.

The signal conversion means 15 is employed to convert the ac signal produced by the photodetector 13, in response to the interference pattern formed on its face, to another ac signal that carries the test signal information as an equivalent frequency modulation. While signal conversion means 15 may take a variety of forms, conveniently it may take the form illustrated in FIG. 1 of one pair of bandpass filters 47 and 49; a source 51 of a local sinusoidal signal at $\omega_H$ and a local sinusoidal signal at 2 $\omega_H$; a pair of multipliers 53 and 55, each connected to a respective bandpass filter 47 or 49 and to the signal source 51; another pair of bandpass filters 57 and 59, each connected to a respective multiplier; and an adder 61 connected to the other pair of bandpass filters 57 and 59. The signal source 51 may comprise, for example, a clock 63; a pair of frequency dividers 65 and 67, each connected to the clock; and a pair of bandpass filters 69 and 71, each connected to a respective frequency divider. The local signal at $\omega_H$ can be transmitted on line 73 to the driver 41 as the sinusoidal reference signal 25.

The demodulator 17 at the output of the signal conversion means 15 may comprise, for example, an FM discriminator. A display 73 (e.g., an oscilloscope) is connected to the demodulator 17 when display of the waveform of the detected test signal is desired.

In operation, the coiled optical fiber 31 forming the test arm of the interferometer 11 is placed in the medium 75 in which the test signal is to be detected (e.g., an acoustic medium), while the optical fiber 29 forming the reference arm of the interferometer is isolated from the medium. At the same time, the piezoelectric cylinder 43 inside the coiled optical fiber 29 is driven with the reference signal 25. The beamsplitter 27 splits the light beam 19 from the laser 21 into two parts, one part being focused into the test arm by the lens 35 and the other part being focused into the reference arm by the lens 39.

The test signal 23 alters the optical path of the test arm fiber 31 in a manner well known to those skilled in the art (e.g., in the case of an acoustic pressure signal, through strain-induced index of refraction charges and pressure-induced fiber length changes), while the reference signal 25 alters the optical path of the reference arm fiber 29 by piezoelectrically stretching it (the reference signal produces an electromechanical radial displacement of the cylinder around which the fiber is tightly wrapped). The optical path alterations cause the phase difference of the two parts of the split beam to be modulated by the waveforms of the sinusoidal test and reference signals with the reference signal 25 acting as a carrier to the test signal information 23. The lens 37 collimates the output of the test arm; the lens 41 collimates the output of the reference arm. The beamsplitter 33 combines the output of the test arm and the output of the reference arm to produce an intereference pattern on the face of the photodetector 13.

The photodetector 13 responds to the interference pattern formed on its face by producing an ac electrical signal that is proportional to the cosine of the phase difference of the recombined two parts of the split beam. The ac signal is bandpassed by the bandpass filter 47 into one channel at the frequency $\omega_H$ and by the bandpass filter 49 into another channel at the frequency 2 $\omega_H$. The multiplier 53 multiplies the ac signal in the $\omega_H$ channel by a local signal at 2 $\omega_H$ from the signal source 51, and the multiplier 55 multiplies the ac signal in the 2 $\omega_H$ channel by a local signal at $\omega_H$ from the signal source 51.

In signal source 51, the clock 63 generates clock signals, at 1 MHz for example, which are divided by the frequency divider 65 (by a factor of 10, for example) and bandpassed by the bandpass filter 69 at a frequency $\omega_H$ to provide the local signal at $\omega_H$. The clock signals are also divided by the frequency divider 67 (by a factor of 5, for example) and bandpassed by the bandpass filter 71 at a frequency 2 $\omega_H$ to provide the local signal at 2 $\omega_H$. The local signal at $\omega_H$ is fed to the multiplier 55 and also can be supplied on the line 73 to the driver 45 as the reference signal; the local signal at 2 $\omega_H$ is fed to the multiplier 53.

The output of the multiplier 53 is bandpassed by the bandpass filter 57 at a frequency 3 $\omega_H$, and the output of the multiplier 55 is bandpassed by the filter 59 at the same frequency 3 $\omega_H$. The outputs of the bandpass filters 57 and 59 are added in the adder 61. If the peak value of the output of the bandpass filter 57 and the peak value of the output of the bandpass filter 59 are made the same, as for example by adjusting the amplitude of the reference signal 25 or by employing a relative gain difference between the channels, the output of the adder 61 is an ac signal at the frequency 3 $\omega_H$ which carries the test signal information 23 as an equivalent frequency modulation. The test signal information is extracted from the adder 61 output signal by means of the FM discriminator 17 and the waveform of the detected test signal can be displayed on the display 73.

Figure 2:
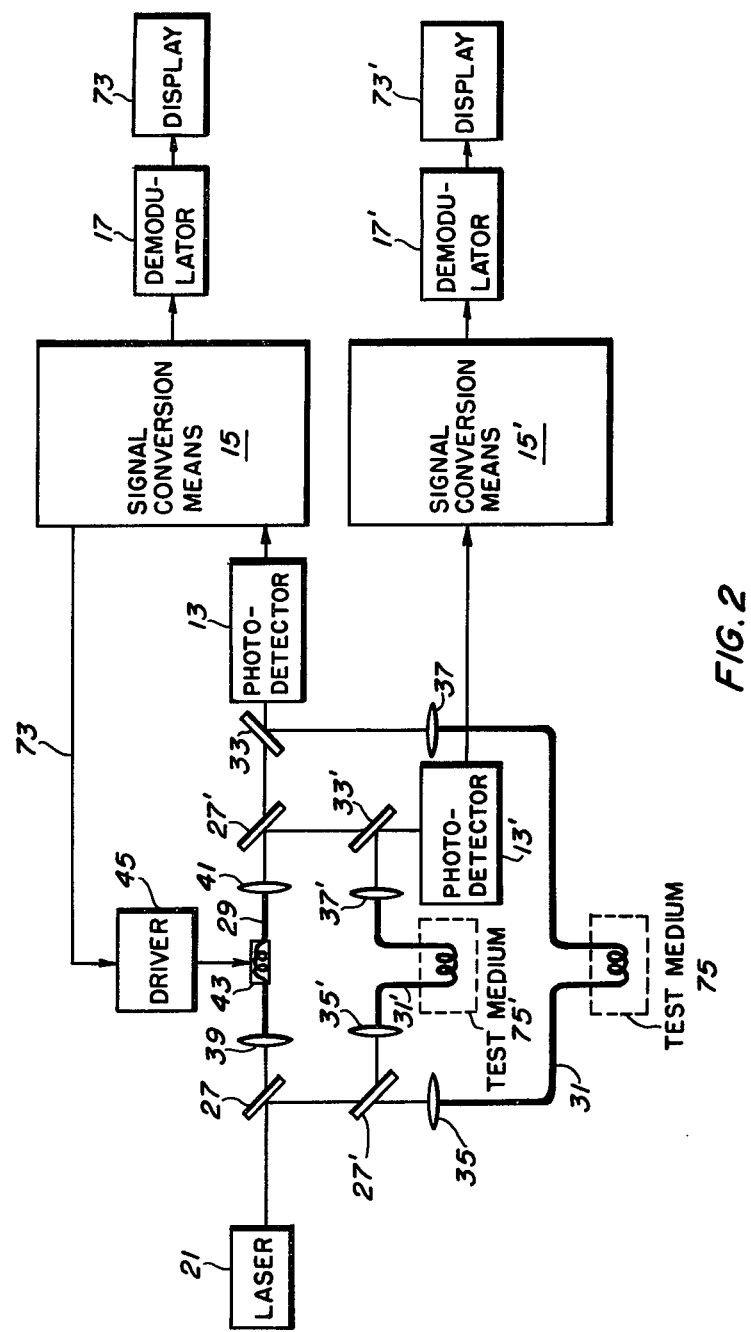
FIG. 2 is a block schematic diagram of a second embodiment of the test signal waveform detector according to the invention, wherein a plurality of test arms are provided.

The foregoing description has been made by reference to an example wherein only one test signal was detected. FIG. 2 illustrates an alternative embodiment in which more than one test signal waveform at a time is detected, a plurality of test arms being represented in the figure. Whereas FIG. 2 shows only two test arms, it may be easily extended to a plurality of test arms. FIG. 2 is clearly self-explanatory from the figure itself, since the same reference numerals have been used as in FIG. 1 for corresponding parts, and the same reference numerals with primes affixed have been used for new elements having like functions. It will be noted that despite the fact that the number of tests arms is increased, only one reference arm containing a driven piezoelectric cylinder 43 is needed. Since the number of reference arms is a significant factor in determining the size and economy of a test signal waveform detector, any design which significantly reduces the number of reference arms would enjoy an economic advantage due to that feature alone. Further, while each signal conversion means in FIG. 2 has been illustrated as including a signal source; it is to be understood that one signal source could be used for both signal conversion means 15 and 15′.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A test signal waveform detector comprising:

an interferometer for splitting into two parts a light beam from an external coherent light source, for modulating the phase difference of the two parts by the waveform of a sinusoidal test signal and the waveform of a sinusoidal reference signal, the reference signal having a frequency $\omega_H$ and acting as a carrier to the test signal information, and for recombining the two parts of the split beam to form an interference pattern;

a photodetector disposed at the output of the interferometer and responsive to forming of the interference pattern for producing an ac signal that is proportional to the cosine of the phase difference of the recombined two parts of the split beam;

signal conversion means connected to the photodetector for converting the ac signal produced by the photodetector to another ac signal that carries the test signal information as an equivalent frequency modulation; and a demodulator connected to the signal conversion means for extracting the test signal information from the other ac signal.

2. The test signal waveform detector recited in claim 1 wherein the signal conversion means includes:

one pair of bandpass filters connected to the photodetector for bandpassing the ac signal produced by the photodetector into one channel at the frequency $\omega_H$ and into another channel at a frequency $2\omega_H$;

a source of a local sinusoidal signal at $\omega_H$ and a local sinusoidal signal at $2\omega_H$;

a pair of multipliers, each connected to a respective bandpass filter and to the signal source for multiplying the ac signal in the $\omega_H$ channel by the local signal at $2\omega_H$ and for multiplying the ac signal in the $2\omega_H$ channel by the local signal at $\omega_H$;

another pair of bandpass filters, each connected to a respective multiplier, for bandpassing the multiplied ac signals in the two channels at a frequency $3\omega_H$; and an adder connected to the other pair of bandpass filters for adding the outputs thereof to produce an ac signal at the frequency $3\omega_H$ which carries the test signal information as an equivalent frequency modulation.

3. The test signal waveform detector recited in claim 2 wherein the interferometer includes:

a beamsplitter for splitting a light beam into two parts;

a beam of coiled optical fibers respectively forming the test and reference arms;

another beamsplitter for combining the outputs of the test and reference arms to produce an interference pattern on the detector;

one pair of lenses disposed between the beamsplitters and the test arm fiber for focusing one part of the split beam into the test arm and for collimating the output of the test arm; and another pair of lenses disposed between the beamsplitters and the reference arm fiber for focusing the other parts of the split beam into the reference arm and for collimating the output of the reference arm.

4. The test signal waveform detector recited in claim 3 wherein the interferometer includes:

a thin-walled piezoelectric cylinder inserted inside the coil of the reference arm fiber; and a driver connected to the cylinder and to the signal source for driving the cylinder with the local sinusoidal signal at $\omega_H$.

5. The test signal waveform detector recited in claim 2 wherein the signal source includes:

a clock;

a pair of frequency dividers, each connected to the clock; and a pair of bandpass filters, each connected to a respective frequency divider for bandpassing their outputs.

6. A method for detecting a test signal waveform comprising the steps of:

splitting a coherent light beam into two parts;

modulating the phase difference of the two parts by the waveform of a sinusoidal test signal and the waveform of a sinusoidal reference signal at a frequency $\omega_H$ so that the reference signal acts as a carrier to the test signal information;

recombining the two parts of the split beam to form an interference pattern;

in response to the forming of the interference pattern, producing an ac signal that is proportional to the cosine of the phase difference of the recombined two parts of the split beam;

converting the ac signal to another ac signal that carries the test signal information as an equivalent frequency modulation; and extracting the test signal information from the other ac signal.

7. The method recited in claim 6 wherein the converting step includes:

bandpassing the ac signal produced by the photodetector into one channel at the frequency $\omega_H$ and another channel at a frequency $2\omega_H$;

multiplying the ac signal in the $\omega_H$ channel by a local signal at $2\omega_H$;

multiplying the ac signal in the $2\omega_H$ channel by a local signal at $\omega_H$;

bandpassing the multiplied ac signals in the two channels at a frequency $3\omega_H$; and adding the bandpassed signals at frequency $3\omega_H$ together to produce an ac signal at the frequency $3\omega_H$ which carries the tet signal information as an equivalent frequency modulation.

* * * * *